March 6, 1934.  E. A. HECKLER  1,949,909
MOTION PICTURE APPARATUS
Filed June 10, 1933   3 Sheets-Sheet 1
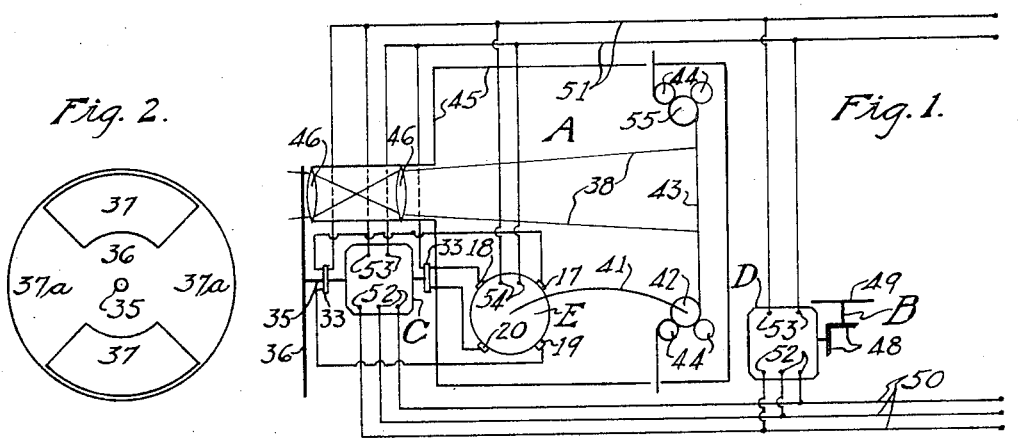
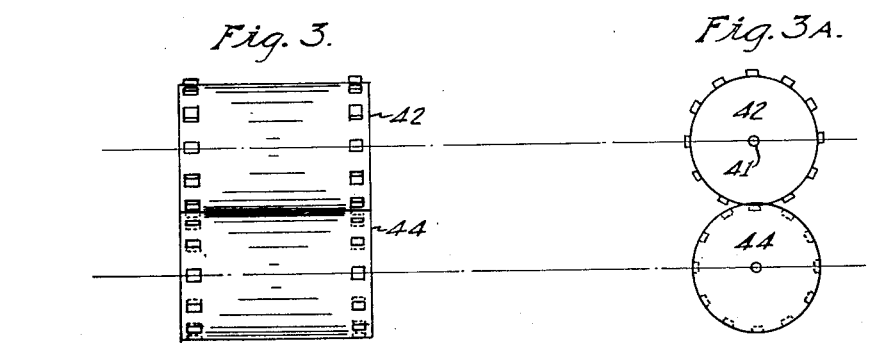
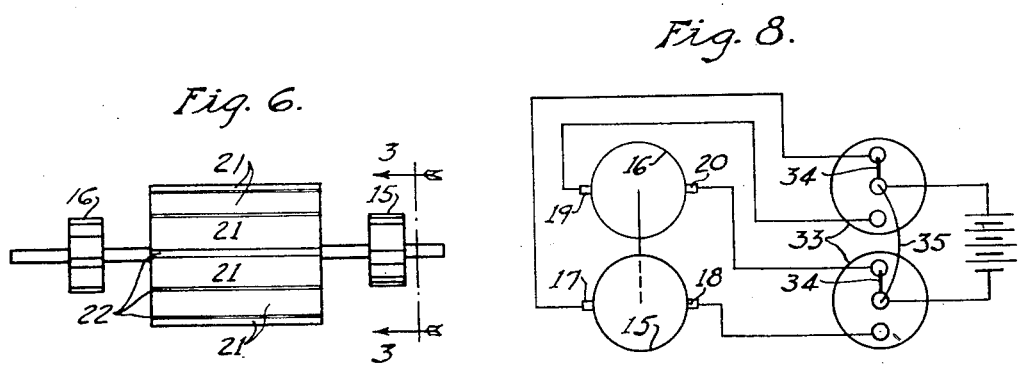
INVENTOR
Ernest A. Heckler
BY A. B. Reeves
ATTORNEY March 6, 1934.  E. A. HECKLER  1,949,909
MOTION PICTURE APPARATUS
Filed June 10, 1933   3 Sheets-Sheet 2

INVENTOR
Ernest A. Heckler
BY a. B. Ruvis
ATTORNEY

March 6, 1934.  E. A. HECKLER  1,949,909
MOTION PICTURE APPARATUS
Filed June 10, 1933   3 Sheets-Sheet 3

INVENTOR
Ernest A. Heckler
BY a. B. Rivers
ATTORNEY

Patented Mar. 6, 1934

1,949,909

UNITED STATES PATENT OFFICE 1,949,909

MOTION PICTURE APPARATUS

Ernest A. Heckler, Lansdale, Pa.

Application June 10, 1933, Serial No. 675,199

9 Claims. (Cl. 88—16.2)

My invention relates to moving picture apparatus and it has for an object to provide an intermittent rotary electric motor to traverse the film, whereby this operation may be rendered very quiet.

Heretofore, where the camera and sound recording apparatus are operated by synchronous motors, it has been necessary to take special precautions to prevent camera operating noise from being imposed on the sound record. It is, therefore, common practice to have the camera placed in a sound-proof compartment to prevent the effect of its noise being transmitted to the sound recorder; however, this way of avoiding the difficulty interferes with free movement of the camera and limits positioning thereof. If operation of the camera could be made sufficiently quiet, then it would be unnecessary to use the enclosure and the camera could be more freely positioned. As practically all of the noise emanates from the intermittent mechanism for traversing the film, I avoid noise on this account by having the film traversed by an intermittent rotary electric motor, which is inherently quiet, and make possible the satisfactory use of a camera without an enclosure when used in conjunction with sound recording apparatus. The intermittent electric motor is interconnected with the synchronous motors operating the camera shutter and the sound recording apparatus so as to effect movements of the film during periods of obscuration by the shutter. Hence, a further object of my invention is to provide a camera and sound recording apparatus wherein the film of the camera is traversed by an intermittent electric motor so that the camera may be made sufficiently quiet in operation to avoid the necessity for the use of an enclosure therefor.

A further object of my invention is to provide photographic apparatus having the film traversed by an intermittent rotary electric motor which is constructed and arranged to provide for definite or predetermined movement cycles.

A more particular object of my invention is to provide a motor for traversing a photographic film and having the following advantageous features of construction and operation: first, means for starting the rotor from rest at a predetermined point on the rotor when that point lies in a plane of reference which includes the rotor axis; second, to provide means by which the rotor is stopped at a second predetermined point on the rotor and removed from the first point a fraction of a revolution when the second point lies in the plane of reference; third, to make provision for holding the rotor stationary at the second point until such time as additional motion is required; and, fourth, to make provision by which the above motions may be repeated, in the order named, indefinitely, and thus provide an electric motor which will deliver intermittent rotary motion suitable for moving the film during periods when light is obscured by the shutter.

A further object of my invention is to provide an electric motor having an armature provided with propelling and holding windings together with circumferentially spaced groups of commutator segments providing for starting of the rotor, thereafter in reducing the torque due to the effect of armature reaction and to reduction in current supplied to the propelling winding, and finally providing for termination of the movement cycle due to the effect of the holding winding being positioned to thread or pass the maximum flux whereby the motor may have such definite intermittent movement as to traverse a film satisfactorily.

These and other objects are effected by my invention as will be apparent from the following description and claims taken in connection with the accompanying drawings in which:

Fig. 1 is a diagrammatic view of photographic and sound record apparatus having my invention applied thereto;

Fig. 2 is a detail view of the shutter used in Fig. 1;

Figs. 3 and 3a are detail views of improved film traversing sprockets;

Fig. 6 is a side elevation of the armature showing the relation of the commutators to the laminations;

Fig. 8 is a wiring diagram showing the connections between the motor and the source of electric current.

Figure 4:
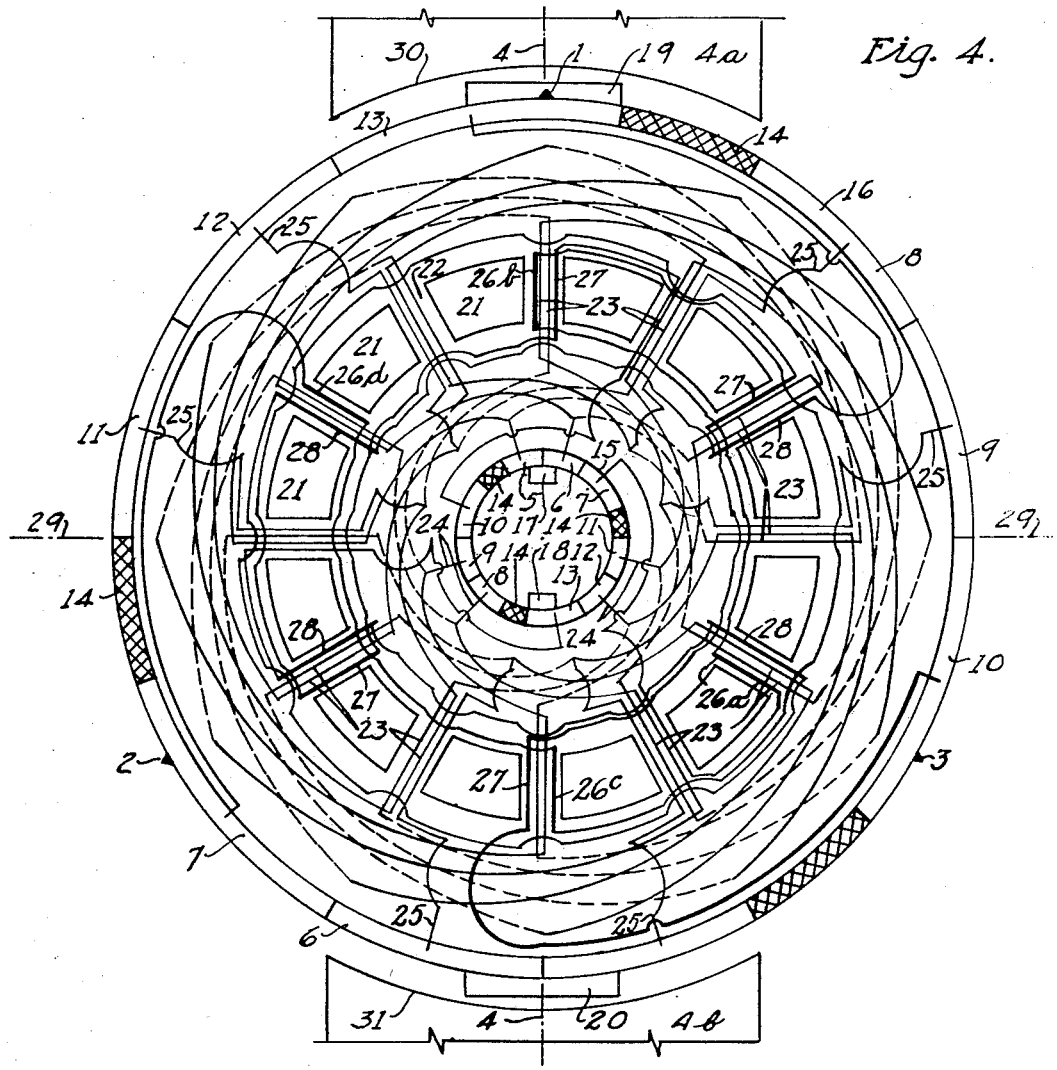
Fig. 4 is a circular development of the entire winding of the intermittent rotary electric motor, with the commutators and connections shown diagrammatically.

In accordance with my invention, I provide a motion picture organization comprising photographic apparatus and a sound recorder driven by synchronous motors in a known manner, but wherein, instead of having the film traversed by intermittent rotary mechanical transmission mechanism, the film is traversed by an intermittent rotary electric motor, with the result that the photographic apparatus is rendered sufficiently quiet in operation to make unnecessary isolation of the latter in a sound-proof compartment to avoid marring of the sound record. The intermittent rotary, film-driving, electric motor is interconnected with the synchronous motors driving the photographic apparatus and the sound recorder so that film movements take place during periods of obscuration of the photographic apparatus. The organization will be first described followed by a description of the intermittent rotary electric motor.

Referring to Fig. 1, I show a camera A and a sound recorder B driven by synchronous motors C and D, respectively, interconnected in a well-known manner. The film of the camera is traversed step-by-step during periods of camera obscuration by the intermittent rotary electric motor E, the motor E being operated in properly timed relation to assure the accomplishment of this result.

The camera A is provided with a shutter 36, preferably of the rotary type, having openings 37 separated by light-obscuring portions 37a for passing and blocking light rays, as indicated at 38, to the interior of the camera. In addition to turning of the shutter 36, the synchronous motor C also simultaneously operates the distributors 33, the shutter 36 and the distributors 33 preferably being connected to the motor shaft 35, in such a manner as to cause the brushes 17 and 20 of the intermittent rotary electric motor E to act together while the brushes 19 and 18 of the latter are in open circuit and vice versa.

The intermittent rotary electric motor E has its shaft 41 connected to the film-driving sprocket 42. Not only is this means for imparting step-by-step movement to the film inherently quiet, but quietness is further promoted by having the sprocket made of some semi-hard material, such as rubber, that will operate quietly when meeting the film 43. The teeth of the film-driving sprocket 42, as well as of the film-propelled sprocket 55, engage in rows of openings disposed adjacent to the side edges of the film. Idlers 44, preferably also made of semi-hard material, are arranged at the opposite side of the film from the sprockets 42 and 55 and have openings to receive the sprocket teeth (see Fig. 3). The sprockets are arranged in the camera box 45 so as to locate the film 43 properly with respect to light rays entering through the lenses 46.

The sound-recording equipment B is driven by the synchronous motor D, the motor being connected by suitable gears 48 to the turntable 49 for turning the latter. A wax disc is placed on the turntable for sound recording in the usual way. It is to be understood that illustration and reference to disc sound recording are by way of example only and that the invention is applicable to any suitable mode of sound recording.

Armature current is supplied to both synchronous motors C and D from alternating current mains 50 connected to terminals 52 and field current is supplied from the direct current mains 51 connected to the motor terminals 53.

The camera shutter 36 is placed on the shaft of the synchronous motor C so that light rays may not enter the camera when the distributors 33 permit current to flow through the pair of brushes 17 and 20 or the pair of brushes 19 and 18 of the motor E. This adjustment causes the motor E to move the film 43 only when light cannot enter the camera. The motor E and the sprocket 42 are constructed and arranged to cause the film to move just the required amount so that consecutive pictures may be photographed.

While the intermittent rotary electric motor E may be of the alternating or direct current type, in Fig. 1, I show one of the direct current type, the field being connected to the terminals 54, which are connected to the direct current mains 51, and the armature being supplied with direct current through the intermediary of the distributors 33 and of the pairs of brushes 17 and 20 and 19 and 18.

Referring now to Figs. 4 to 9, inclusive, in connection with the intermittent rotary electric motor E, in the particular embodiment of the invention chosen for illustration I show an intermittent rotary electric motor of the two-pole type using direct current to excite the field and one having a lap armature winding, but, so far as the objects of my invention are concerned, it is not essential that the machine have only a single pair of poles, or use direct current, for the same principles are applicable to motors having two or more sets of poles or which use alternating current. The principles are also applicable when the armature is made the stator and the field is made the rotor as well as when other types of armature windings are used.

In Figs. 4 and 9, 1, 2, and 3 represent predetermined points on the armature at which it is proposed to cause the armature to start from rest, or come to rest, when any of these points lie in the plane of reference indicated at 4, which includes the longitudinal center line of the pole pieces 4a and 4b.

The armature is provided with circumferentially spaced groups of commutator segments cooperating with the pairs of brushes 17, 20 and 19, 18 so as to secure intermittent movement cycles, the arrangement being such that, with completion of a movement cycle incident to one pair of brushes traversing a pair of segment groups, the other pair of brushes will be placed in initial position with respect to the pair of succeeding groups of segments, and, when current is supplied to the latter pair of brushes, the next movement cycle will take place. Distributors are provided, as elsewhere herein more particularly described, for supplying current alternately to the pairs of brushes.

The commutator segments 5, 6 and 7, of low resistance and separated from each other by a suitable dielectric, are grouped to transmit current during one cycle of motion; during the next movement cycle, the groups of commutator segments 8, 9, and 10 are effective; and the following cycle is taken care of by the groups of commutator segments 11, 12, and 13. After completion of the movement cycle, with the segment groups 11, 12, and 13 effective, the segments 5, 6, and 7 are positioned for the next cycle and so on. Each group of commutator segments is separated from the following group by a segment of dielectric 14. For purposes which will later appear, the segments of the groups may be of unequal length of arc, and they are insulated from and fastened to the armature shaft by any of the usual means.

I prefer to use two like commutators, 15 and 16, which, when placed on the same central axis, have like segments on either commutator 180 circular degrees apart. The commutators are preferably placed at either end of the armature.

Each commutator has two brushes sliding thereon. Brushes 17 and 18 slide on the commutator 15 and brushes 19 and 20 slide on the commutator 16. The brushes are of such resistance as is consistent with good commutation.

The brushes 17 and 19 are alternately connected to the source of electric current so as to transmit current into the commutators 15 and 16, and the brushes 18 and 20 are alternately connected so as to transmit current away from the commutators. Brushes 17 and 20 act in unison to pass current through the armature, while the brushes 19 and 18 are in an open circuit, and vice versa, as will be explained later.

In the drawings, 21 represents the face of an armature post. Between adjacent posts, a space or slot 22 is provided sufficient in size to pass the required amount of conductors. Each conductor may be made up of one or more wires. Those conductors which are a part of the main winding and which act to propel the armature, and herein termed the "propelling winding", are indicated by the numeral 23, with subscripts "a", "b", "c" and "d" to point out irregularities in the action of certain of these conductors. The conductors 23 are connected with the first and second segments 5 and 6 of the groups 5, 6, and 7, with the first and second segments 8 and 9 of the groups 8, 9, and 10, and with the first and second segments 11 and 12 of the groups 11, 12, and 13 on the commutators, but the conductors are only supplied with current through those segments which are under the influence of that set of brushes in series with the source of current. Leads 24 connect conductors 23 with the first and second segments of the groups on the commutator 15, while leads 25 connect such conductors with corresponding segments on the commutator 16.

In addition to the propelling winding consisting of the conductors 23, the armature is provided with as many separate holding windings or circuits as there are movement cycles per revolution of the armature. The reference characters 26a, 26b, 26c, and 26d represent those conductors which are a part of one holding winding or circuit connected with the source of current through the commutator segments 7. The segments 10 and 13 are connected to holding windings 27 and 28, respectively. Only one of the holding windings or circuits is active during one cycle of motion.

Figure 7:
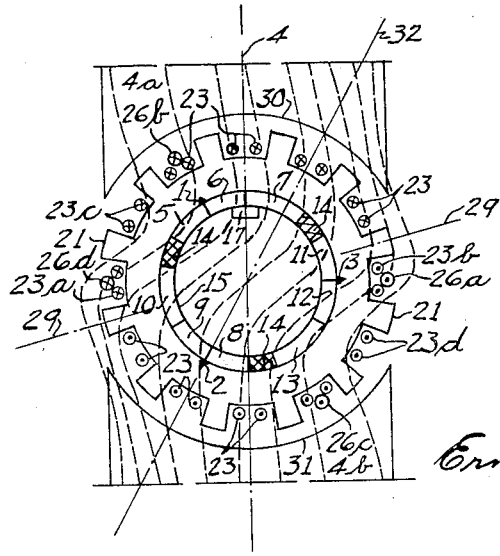
Fig. 7 is a diagrammatic view showing the field and its position with respect to various parts carrying current when the armature is in the position shown.

In Fig. 7, the direction of current is indicated by a cross when it enters the paper and by a dot when it leaves the paper through conductors shown perpendicular to the plane of the paper.

The armature may be of a usual design except that for this particular motor it should contain any even number of posts or slots divisible by three. This is not essential to the application of the principles here exemplified, but is necessary to put the machine in mechanical and magnetic balance and to make the amounts of motion delivered equal.

The reference character 29 represents the neutral plane of the armature, above which all conductors 23 carry current in one direction and below which all conductors 23 carry current in the opposite direction.

The length of arc of the faces of the north and south poles 4a and 4b are represented by 30 and 31.

When referring to torque in the following description, I shall use the words "plus torque" to indicate torque in the counter-clockwise direction and the words "minus torque" to indicate torque in the clockwise direction.

Referring to Fig. 4, in which the predetermined point 1 lies in the plane of reference 4, if current is passed from brush 17 through segments 5 and 6 on commutator 15, into the winding through leads 24, and out through leads 25 and corresponding segments on the commutator 16, and finally through the brush 20, all conductors 23 above the neutral plane carry current toward the commutator 16 and all conductors 23 below the neutral plane carry current toward the commutator 15. Also, if the poles are excited in such a manner that flux flows from the pole face 30 to the pole face 31, each conductor will have exerted thereon a force acting in such a direction as to create a plus torque. Responding to this torque, the armature moves in a counter-clockwise direction.

Before proceeding further with armature rotation, attention is directed to the distorted field which is set up by armature reaction, the combined field which results from that set up by the poles and that set up by the armature being crowded into the leading pole tips, as shown in Fig. 7. Field distortion cooperates with the armature conductors to assist in torque reduction incident to termination of a movement cycle.

During the rotation of the armature, it will be readily seen that conductors 23 receive current and deliver torque as long as brushes 17 and 20 remain in contact with segments 6 and that conductors 26a, 26b, 26c, and 26d will receive current and deliver torque as soon as the segments 7 contact with the brushes 17 and 20. Also, because the resistance of any electric current carrier varies inversely as the area normal to the flow, brushes 17 and 20 act as slide valves on segments 6 and 7, decreasing the current in segments 6 and conductors 23 and increasing the current in the segments 7 and the conductors 26a, 26b, 26c, and 26d, as the armature proceeds in the counter-clockwise direction. The effect of this action is two-fold, in that the plus torque created by the conductors 23 is uniformly decreased from a maximum value to zero, while the current is uniformly increased from zero to a maximum in the conductors 26a, 26b, 26c, and 26d. Also, as segments 6 move from under brushes 17 and 20, the neutral plane 29 of the armature rotates from its original position in Fig. 4 through the position shown in Fig. 7 until such time as the segments 6 leave the brushes 17 and 20. This action causes conductors 23a and 23b, Fig. 7, to enter the distorted field at a point of maximum density; and, because the direction of the field with respect to these conductors has been changed while the current still flows in the original direction, the torque exercised by these conductors is minus. By the same action, conductors 23c and 23d are taken out of the field and hence develop no torque. Therefore, because the conductors 23c and 23d are removed from the field and because conductors 23a and 23b cause a minus torque to exist coupled with uniform decrease in current in all the conductors 23 as segments 6 leave the brushes 17 and 20, the plus torque is rapidly reduced from a maximum value to zero.

Figure 5:
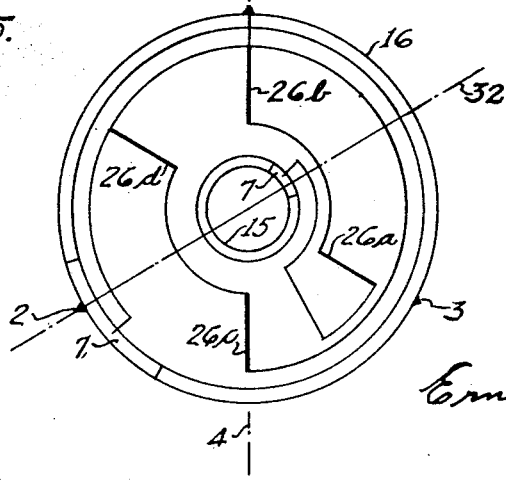
Fig. 5 is a diagrammatic circular development of one holding circuit.

In Figs. 4 and 5, it will be found that conductors 26a and 26c are connected so as to carry current toward commutator 15 and conductors 26b and 26d so as to carry current toward the commutator 16. Hence, as segments 7 come into contact with the brushes carrying current, conductors 26b and 26c exert a plus torque while conductors 26a and 26d exert a minus torque, but because conductors 26a and 26d are operating in a more dense field than conductors 26b and 26c, Fig. 7, the net torque is minus and the effect is to brake the counter-clockwise rotation of the armature. It will now be seen that, by varying the length of arc of the segments 6 and 7, the conductors 23 and 26a, 26b, 26c, and 26d may be continued in operation for a greater or lesser period of armature rotation.

At the instant when segments 6 leave the brushes 17 and 20, the conductors 23 cease to act and armature reaction consequently ceases, at which time the field through the armature assumes its normal straight path. Conductors 26a, 26b, 26c, and 26d are then moving in a normal field, 26a and 26b under the influence of the pole face 30 and 26c and 26d under the influence of the pole face 31. Moreover, conductors 26a and 26b act together as a coil, as do conductors 26c and 26d, and thus will continue to move in the normal field until such time as they include the maximum amount of field flux, at which time they will stop and remain stationary as long as current is supplied to the holding circuit through segments 7, Fig. 9. Therefore, by making the pole faces 30 and 31 to conform to such dimensions so that the field flux may just be included between conductors 26a and 26b and between conductors 26c and 26d, a means is provided for bringing the armature to rest.

By placing the centerline between conductors 26a and 26b, as well as that between the conductors 26c and 26d, in the plane 32, Figs. 5 and 7, which includes the predetermined point 2 and the axis of the armature, an accurate means is provided for bringing the armature to rest when the predetermined point 2 lies in the plane of reference.

Figure 9:
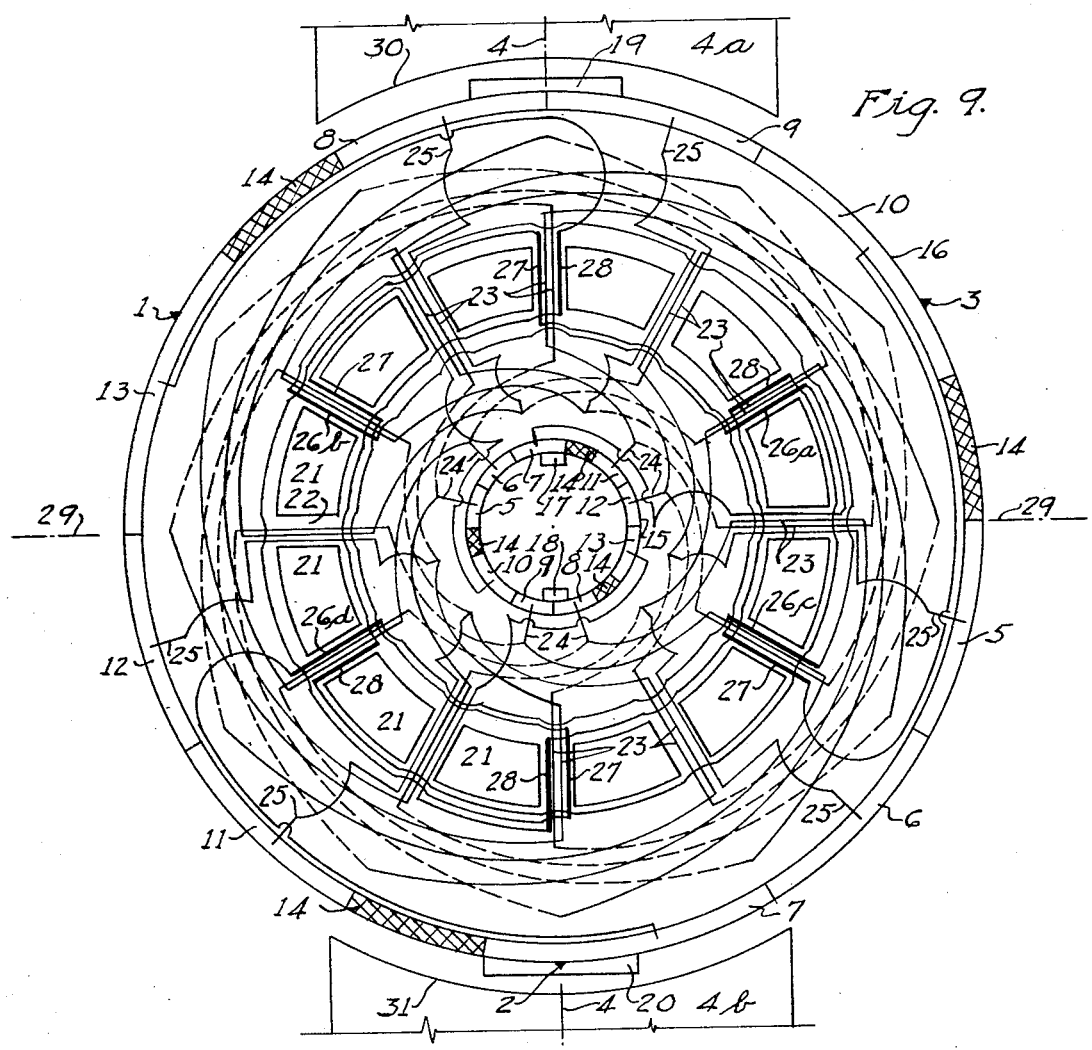
Fig. 9 is a view similar to Fig. 4 but showing the rotor advanced by one movement cycle from the position shown in the latter view.

As will be apparent from Fig. 9, when the point 2 nears its position of rest in the plane of reference, commutator segments 8 and 9 contact brushes 19 and 18. By means which will be presently explained, brushes 17 and 20 are cut out of circuit and brushes 19 and 18 are cut in at the instant when further motion of the armature is required. The current now enters the conductors 23 through segments 8 and 9 on commutator 16 and leaves by way of the corresponding segments on the commutator 15. Hence, by a proper selection of leads to either commutator, I repeat all of the electrical conditions that obtained within the armature when it first started to move, and the functions that were performed by conductors 23 above and below the neutral plane are again performed by those conductors which now lie above and below that plane. The functions performed by the conductors 26 and the segments 7 are now repeated by the conductors 27 and the segments 10. Likewise, if the various commutator segments with their respective leads are grouped as described and placed around the commutator in sequence at equal intervals, separated from each other by segments of dielectric 14, a means is provided for securing equal fractional turns of the armature for each revolution thereof.

The pairs of brushes 17 and 20 and 19 and 18 are rendered alternately effective and the frequency of the motor is controlled by any suitable means. For example, Fig. 8 shows a convenient means for accomplishing these results. Brushes 19 and 18 are shown cut out of the circuit while brushes 17 and 20 are in series with the source of current through the distributors 33 whose rotors 34 are rigidly connected by the shaft 35. When the shaft 35 is rotated through 180 circular degrees, either manually or otherwise, the rotors 34 then connect the brushes 19 and 18 in series with the source of current while the brushes 17 and 20 are cut out. This action may continue indefinitely and the frequency with which the motor described moves is thereby governed.

From the structure described, it will be apparent that the armature has successive cycles of movement each 60 circular degrees in extent. Assuming that the armature starts from the position shown in Fig. 4, in which the point 1 is in the plane of reference 4, then the first cycle of counter-clockwise movement brings the point 2 into the plane of reference, as shown in Fig. 9; the second cycle brings the point 3 into the plane; the third cycle brings the point 1 into the plane 180 degrees from the position shown in Fig. 1; the fourth cycle brings the point 2 into the plane at the top of Figs. 4 and 9; the fifth cycle brings the point 3 into the plane at the bottom; and the sixth cycle brings the point 1 into the plane at the top, which is the starting position, as shown in Fig. 4.

With the structure heretofore described, the armature is always stopped so that a pair of brushes engage both the first and second segments, or the propelling winding segments, of diametrically opposed segment groups; and, when such brushes are placed in circuit, the motor starts in the usual way, the coils undergoing commutation being short circuited through the brushes, since the latter are each engaging two segments. Just as soon as current is supplied from the brushes to the propelling winding, the field suffers distortion, as shown in Fig. 7, this distortion continuing as long as current flows in the propelling winding. As soon as the brushes leave the first segments, the commutating action ceases for the remainder of the movement cycle; and, as soon as the center lines of the brushes move past the center lines of the second segments, the neutral plane moves from its normal position and in the direction of rotation with the effect of torque reduction due to minus torque in some conductors, zero torque in other conductors, reduced current flowing in the propelling winding because of diminishing contact area of the brushes with the second segments, and the minus torque condition occurring with the effective holding winding as long as current is supplied to the propelling winding.

It will be apparent to those skilled in the art that the principles of my intermittent rotary motor may be variously applied: any suitable number of pairs of poles may be employed; the segment group arcs may be made longer or shorter; any suitable number of propelling winding segments may be incorporated in the groups; and the segments may be variously proportioned. Any suitable brush width may be employed so long as the arc of contact thereof does not exceed the arcuate length of the dielectric segments 14. With a two-pole machine, as heretofore set forth, to secure magnetic and running balance, the rule is that any even number of armature posts or slots may be employed so long as the number is divisible by three.

For a four-pole machine, the rule for magnetic and running balance is any even number of posts or slots divisible by four. With a four-pole machine, only two holding circuits are needed regardless of whether two or four predetermined points are provided for. If the arrangement is for four predetermined points, the brushes acting together slide on the same commutator, whether the machine be of the two-pole or of the four-pole type. Three predetermined points cannot be arranged for a four-pole machine, but can be used with a two-pole machine, as heretofore described, or with a six-pole machine, in which case the brushes acting in unison do not slide on the same commutator, but on opposite commutators, as shown on the drawings.

Where the motor is provided with a ground return, the return brush may be omitted and a single commutator is, therefore, sufficient.

While I have shown and described a motor of the intermittent rotary uni-directional type, it will be apparent that the principles of the invention may be employed in a motor capable of operating in either direction. For example, with a two-pole machine of the type particularly described, there would be two commutators for each direction, or a total of four. Also, the armature would preferably have a propelling winding for each direction of rotation to avoid interference difficulty, particularly with the holding circuits.

From the foregoing, it will be apparent that I have devised a novel motion picture organization which is advantageous in that the camera need not be located in a sound-proof compartment to avoid imposing camera noise on a sound record, this being made possible by the novel means, the intermittent rotary electric motor, for traversing the film, such means being inherently quiet. My invention is also useful in traversing the film in a projector, and, accordingly, the term "photographic device", as used in the claims, is intended in a generic sense to cover either a camera or a projector.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the claims.

What I claim is:

1. In motion picture apparatus, a photographic device including a shutter and a film, a sound record device, means for effecting synchronous operation of the shutter and of the sound record device, and an intermittent rotary electric motor under control of said means for traversing the film during shutter obscuration periods.

2. In motion picture apparatus, a photographic device including a shutter and a film, a sound record device, interconnected synchronous electric motors for driving the shutter and the sound record device, an intermittent rotary electric motor for traversing the film, and timing means operated by the shutter synchronous motor for securing operation of the film motor during periods of shutter obscuration.

3. In motion picture apparatus, a photographic device including a shutter and a film; a sound record device; interconnected synchronous electric motors for driving the shutter and the sound record device; an intermittent rotary electric motor for traversing the film and including a stator and a rotor provided with field and armature elements, commutator means for the armature including a plurality of circumferentially-spaced groups of segments, brushes cooperating with the commutator means and positioned so that, with traversal of one group by one brush, another brush is placed in initial position relatively to another group; and a distributor driven by the shutter motor for supplying electric current alternately to said brushes to secure operation of the film motor during periods of shutter obscuration.

4. In motion picture apparatus, a photographic device including a shutter and a film; a sound record device; interconnected synchronous electric motors for driving the shutter and the sound record device; an intermittent rotary electric motor for traversing the film and including a stator and a rotor provided with field and armature elements, propelling and holding windings on the armature, and means providing for successive cycles of energization of the propelling and holding windings; and timing means operated by the shutter motor and controlling the operation of the last-named means to secure film movement during periods of shutter obscuration.

5. In motion picture apparatus, a photographic device including a shutter and a film; a sound record device; interconnected synchronous motors for driving the shutter and the sound record device; an intermittent rotary electric motor for traversing the film and including a stator and a rotor having field and armature elements, commutator means including circumferentially-spaced groups of commutator segments, and a pair of brush means cooperating with the segment groups and effective alternately to energize the film-traversing motor; and a distributor operated by the shutter motor for supplying electric current alternately to said brush means to effect film movement during periods of shutter obscuration.

6. In motion picture apparatus, a photographic device including a shutter and a film; a sound record device; interconnected synchronous electric motors for driving the shutter and the sound record device; an intermittent rotary electric motor for traversing the film and including a stator and a rotor having field and armature elements, the armature element including propelling and holding windings, commutator means including circumferentially-spaced groups of segments connected to the propelling and holding windings, and a pair of brush means cooperating with the groups so that, with termination of a movement cycle by one brush means engaging holding segment or segments, the other brush means is brought to starting position with respect to propelling segments; and a distributor driven by the shutter motor for supplying electric current to the brush means in starting position.

7. The combination as claimed in claim 6 wherein each group of commutator segments includes first and second segments connected to the propelling winding and a third segment connected to a holding winding and wherein a brush means engages both the first and second segments for starting position.

8. The combination as claimed in claim 6 wherein the commutator means includes a pair of commutators and wherein the brush means includes a pair of brushes cooperating with each commutator, each commutator including circumferentially-spaced groups of commutator segments with the groups of one commutator alternately disposed with respect to the groups of the other commutator.

9. In motion picture apparatus, a photographic device including a shutter and a film; a sound record device; synchronous electric motors for driving the shutter and the sound record device; each of said motors including field and armature elements; a single alternating current circuit including the armature elements of both motors; direct current circuit means including the fields of both motors; an intermittent rotary electric motor for traversing the film and including field and armature elements and means utilizing relative movement of the field and armature elements to control the supply of electric current to the armature element to secure starting and stopping of the intermittent rotary electric motor; and means operated by the shutter motor to control the passage of electric current to the armature of the intermittent rotary electric motor to secure movement cycles of the latter during periods of shutter obscuration.

ERNEST A. HECKLER.